US008819592B2

(12) United States Patent
Jackson, Jr.

(10) Patent No.: US 8,819,592 B2
(45) Date of Patent: Aug. 26, 2014

(54) SPARSE DYNAMIC SELECTION TREES

(76) Inventor: Robert Lewis Jackson, Jr., Beitar Illit (IL)

( * ) Notice: Subject to any disclaimer, the term of this patent is extended or adjusted under 35 U.S.C. 154(b) by 364 days.

(21) Appl. No.: 13/226,293

(22) Filed: Sep. 6, 2011

(65) Prior Publication Data

US 2012/0060126 A1  Mar. 8, 2012

Related U.S. Application Data

(60) Provisional application No. 61/380,060, filed on Sep. 3, 2010.

(51) Int. Cl.
*G06F 3/048* (2013.01)
*G06F 17/30* (2006.01)

(52) U.S. Cl.
CPC .... *G06F 17/30589* (2013.01); *G06F 17/30572* (2013.01)
USPC ............................ 715/853; 715/841; 715/859

(58) Field of Classification Search
USPC ................. 715/841, 853–854, 713, 802, 859; 707/741, 797
See application file for complete search history.

(56) References Cited

U.S. PATENT DOCUMENTS

| 5,749,079 | A | 5/1998 | Yong et al. | |
|---|---|---|---|---|
| 6,175,836 | B1 | 1/2001 | Aldred | |
| 6,763,361 | B1 | 7/2004 | Poskanzer | |
| 7,103,600 | B2 | 9/2006 | Mullins | |
| 2003/0065527 | A1* | 4/2003 | Yeh et al. | 705/1 |
| 2007/0180408 | A1 | 8/2007 | Rusu et al. | |
| 2008/0294641 | A1* | 11/2008 | Kim | 707/9 |
| 2009/0182837 | A1 | 7/2009 | Rogers | |
| 2009/0296568 | A1 | 12/2009 | Kitada | |
| 2011/0270606 | A1* | 11/2011 | Crochet et al. | 704/9 |

OTHER PUBLICATIONS

An International Search Report and Opinion for co-pending PCT patent application No. PCT/US2011/050567.
An International Preliminary Report on Patentability (PCT/IB/373) and a Written Opinion of the International Searching Authority (PCT/ISA/237) dated Mar. 14, 2013 for co-pending International Application No. PCT/US2011/050567 (7 pgs).
"Using Hibernate in a Java Swing Application," product tutorial retrieved from website http://netbeans.org/kb/docs/java/hibernate-java-se.html (12 pgs), 2012.

(Continued)

*Primary Examiner* — Weilun Lo
*Assistant Examiner* — Truc Chuong
(74) *Attorney, Agent, or Firm* — Eward J. Radlo; Radlo IP Law Group

(57) ABSTRACT

Systems and methods for use in enabling a user to select one or more data objects from a plurality of data nodes. The method includes determining a data set of interest from one or more data sets. The data set of interest is depicted as a primary node in an available data node area, and one or more data nodes within the data set of interest are depicted as available data nodes within the available data node area. A selection of an available data node is received. When the selected available data node is a data object, the selected available data node is depicted as a selected data node in a selected data node area. When the selected available data node is a data set, the selected available data node is depicted in the available data node area as a secondary data node subordinate to the primary data node.

14 Claims, 8 Drawing Sheets

(56) References Cited

OTHER PUBLICATIONS

"View (database)," retrieved from Wikipedia at http://en.wikipedia.org/wili/View_(database) (3 pgs), Jan. 24, 2012.

"Welcome to the dbViz, Database Visualizer project!" retrieved from website http://jdbv.sourceforge.net/dbViz/, 2003.

T. Sentissi, E. Pichat, "A graphical user interface for object-oriented database," sccc, pp. 227, 17th International Conference of the Chilean Computer Science Society (SCCC '97), 1997.

P. Sawyer, I. Sommerville, "User interface tools for object-oriented database systems," IEE Colloquium on Software Tools for Interface Design, Nov. 8, 1990, pp. 9/1-9/4, London.

* cited by examiner

SPARSE DYNAMIC SELECTION TREES

CROSS-REFERENCE TO RELATED APPLICATIONS

This application claims the benefit of U.S. Provisional Application No. 61/380,060, filed 3 Sep. 2010, which is hereby incorporated by reference in its entirety.

BACKGROUND OF THE INVENTION

The subject matter disclosed herein relates generally to selection of data objects and, more specifically, to systems and methods for use in enabling a user to select one or more data objects from a plurality of edge-connected data nodes.

At least some known software applications present available and selected data objects stored in a graph structure as a list (e.g., unsorted or sorted alphabetically) and/or as a collection of interconnected nodes with no hierarchical organization. Alternatively, at least some known software applications present data objects as nodes in a tree structure that represents a single relationship between the data objects. Notably, such presentation techniques may require a user to navigate through large unorganized lists of objects, a large number of lists, a complex arrangement of unorganized nodes, and/or a fixed hierarchical view that is organized in a manner unrelated to the task the user is performing. Further, the navigation mechanism may need to be redisplayed for each object the user wishes to select, inconveniencing the user and obscuring the set of selected objects as another object is located and selected.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method is provided for use in enabling a user to select one or more data objects from a plurality of edge-connected data nodes that include one or more data sets and one or more data objects. Each data set includes zero or more data objects and zero or more other data sets. The method includes determining, by a computing device, a data set of interest from the one or more data sets. The computing device depicts the data set of interest as a primary node in an available data node area and depicts one or more data nodes within the data set of interest as available data nodes within the available data node area. The computing device also receives a selection of an available data node, depicts the selected available data node as a selected data node in a selected data node area when the selected available data node is a data object, and depicts the selected available data node in the available data node area as a secondary data node that is subordinate to the primary data node when the selected available data node is a data set.

In another aspect, a device including a memory device and a processor coupled to the memory device is provided. The memory device stores a plurality of data nodes that include one or more data sets and one or more data objects. Each data set includes zero or more data objects and zero or more other data sets. The processor is programmed to depict a data set of interest as a primary node in an available data node area, to depict one or more data nodes within the data set of interest as available data nodes within the available data node area, and to receive a selection of an available data node. When the selected available data node is a data object, the processor is programmed to depict the selected available data node as a selected data node in a selected data node area. When the selected available data node is a data set, the processor is programmed to depict the selected available data node in the available data node area as a secondary data node that is subordinate to the primary data node.

In yet another aspect, one or more non-transitory computer-readable media having computer-executable instructions embodied thereon are provided. When executed by at least one processor, the computer-executable instructions cause the processor to: depict a data set of interest as a primary node in an available data node area; depict one or more data nodes within the data set of interest as available data nodes within the available data node area; receive a selection of an available data node; depict the selected available data node as a selected data node in a selected data node area when the selected available data node is a data object; and depict the selected available data node in the available data node area as a secondary data node that is subordinate to the primary data node when the selected available data node is a data set.

BRIEF DESCRIPTION OF THE DRAWINGS

The embodiments described herein may be better understood by referring to the following description in conjunction with the accompanying drawings.

DETAILED DESCRIPTION OF THE INVENTION

Figure 1:
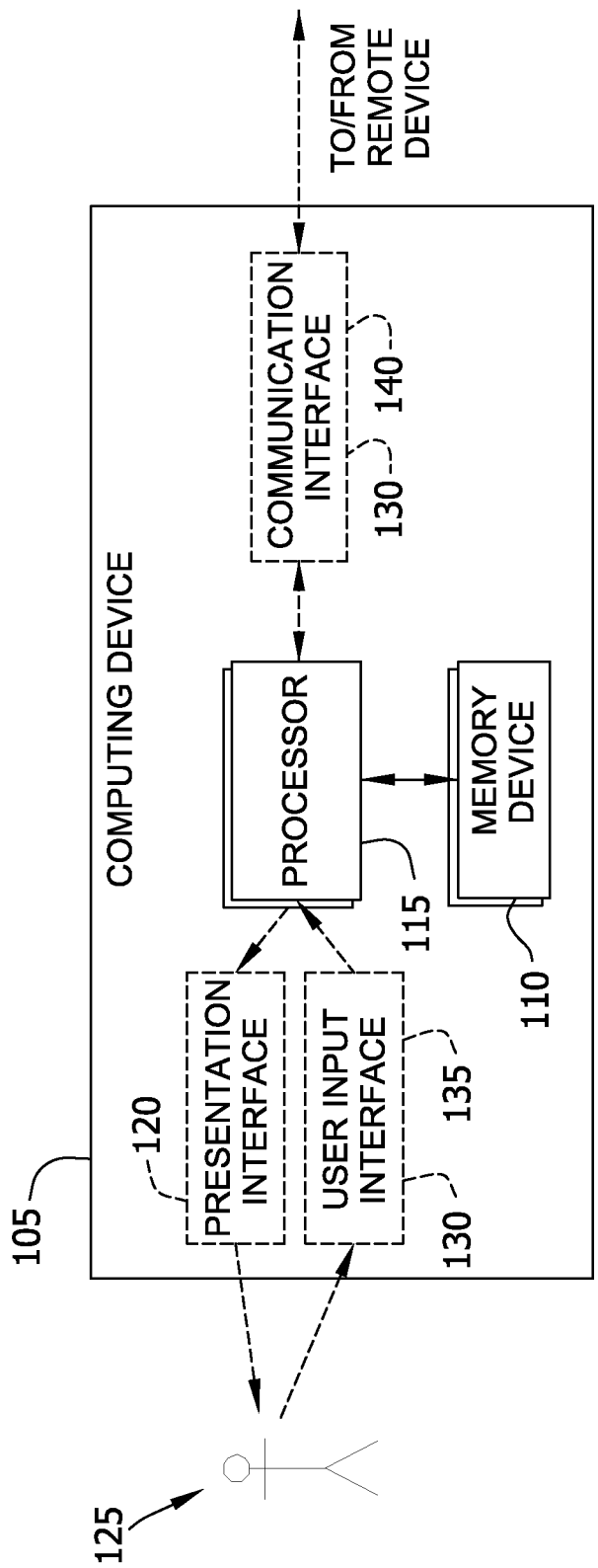
FIG. 1 is a block diagram of an exemplary computing device.

Many graphical user interfaces underutilize the potential to present graphs of data objects in a graphical manner that emphasizes what the user is interested in seeing. For example, a menu of operations in a software program could very easily be presented in a manner that changes from user to user. Similarly, file directories are generally presented as lists with a single window often doing nothing more than displaying a list of files. Such an approach is functionally not distinct from what is provided by a simple textual interface.

Embodiments provided herein allow a user to navigate complex graphs without getting lost and to preserve a clear record in the form of a tree of all of the paths among the nodes selected. The graph may represented relative to selected items using a scheme of relative classification. Such an approach may be used to provide sparseness in the user interface, simplifying the interface by omitting elements that are irrelevant or insignificant with respect to the current task. Further, this approach may be used to represent a graph, which includes relationships between nodes but no hierarchy, as a tree with a hierarchy based on selections made by the user. Accordingly, complex graphs may be presented in a simplified fashion with an emphasis on elements that are relevant to the user.

Exemplary embodiments modify the relative classification in one or more of the following ways: 1) The current subgraph C is constrained to being a tree (acyclic), showing only paths selected by the user; 2) C potentially contains multiple instances of the same node, connected by various paths; 3) Only C is drawn; even the set nodes adjacent to C may not be shown; 4) A set of objects within C are graphically distinguished as selected at any given time; 5) The nodes of C are shown as a stratified tree where, for example, the selected nodes appear in a top-most stratum.

Accordingly, the graph may appear to the user as a simple tree that expands or contracts to reveal complexity. Presented nodes may be either object nodes (with meaning relative to whatever is relevant to the application at hand, such as electronic documents or employees in a company) or set nodes that classify objects (e.g., departments may be sets of employees). Object nodes are constrained according to the relative classification scheme.

Embodiments described enable the presentation of potentially large and complex graphs as a dynamically changing, user-selected sparse stratified trees. Such embodiments facilitate intuitive selection of multiple sets of nodes along with the paths among them, and a minimal representation of selected nodes and (potentially abbreviated) paths among them, shown as a simple tree.

An exemplary technical effect of the methods, systems, and apparatus described herein includes at least one of (a) determining a data set of interest from the one or more data sets; (b) depicting the data set of interest as a primary node in an available data node area; (c) depicting one or more data nodes within the data set of interest as available data nodes within the available data node area; (d) receiving a selection of an available data node; (e) depicting the selected available data node as a selected data node in a selected data node area when the selected available data node is a data object; and (f) depicting the selected available data node in the available data node area as a secondary data node that is subordinate to the primary data node when the selected available data node is a data set.

FIG. 1 is a block diagram of an exemplary computing device 105. Computing device 105 includes a memory device 110 and a processor 115 coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. Processor 115 may include one or more processing units (e.g., in a multi-core configuration).

Memory device 110 is one or more devices that enable information such as executable instructions and/or other data to be stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, a hierarchy of data nodes (e.g., data sets and data objects), node types, computer-executable instructions, and/or any other type of data.

In some embodiments, computing device 105 includes a presentation interface 120 that is coupled to processor 115. Presentation interface 120 presents information, such as data objects and/or classification strategies, to a user 125. For example, presentation interface 120 may include a display adapter (not shown in FIG. 1) that may be coupled to a display device, such as a cathode ray tube (CRT), a liquid crystal display (LCD), an organic LED (OLED) display, and/or an "electronic ink" display. In some embodiments, presentation interface 120 includes one or more display devices. In addition to, or in the alternative, presentation interface 120 may include an audio output device (e.g., an audio adapter and/or a speaker) and/or a printer.

In some embodiments, computing device 105 includes an input interface 130, such as a user input interface 135 or a communication interface 140. Input interface 130 may be configured to receive any information suitable for use with the methods described herein.

In exemplary embodiments, user input interface 135 is coupled to processor 115 and receives input from user 125. User input interface 135 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone). A single component, such as a touch screen, may function as both a display device of presentation interface 120 and user input interface 135.

Communication interface 140 is coupled to processor 115 and is configured to be coupled in communication with one or more remote devices, such as another computing device 105. For example, communication interface 140 may include, without limitation, a wired network adapter, a wireless network adapter, and/or a mobile telecommunications adapter. Communication interface 140 may also transmit data to one or more remote devices. For example, a communication interface 140 of one computing device 105 may transmit an indication of one or more source code portions of interest and/or one or more execution events to the communication interface 140 of another computing device 105.

Figure 2:
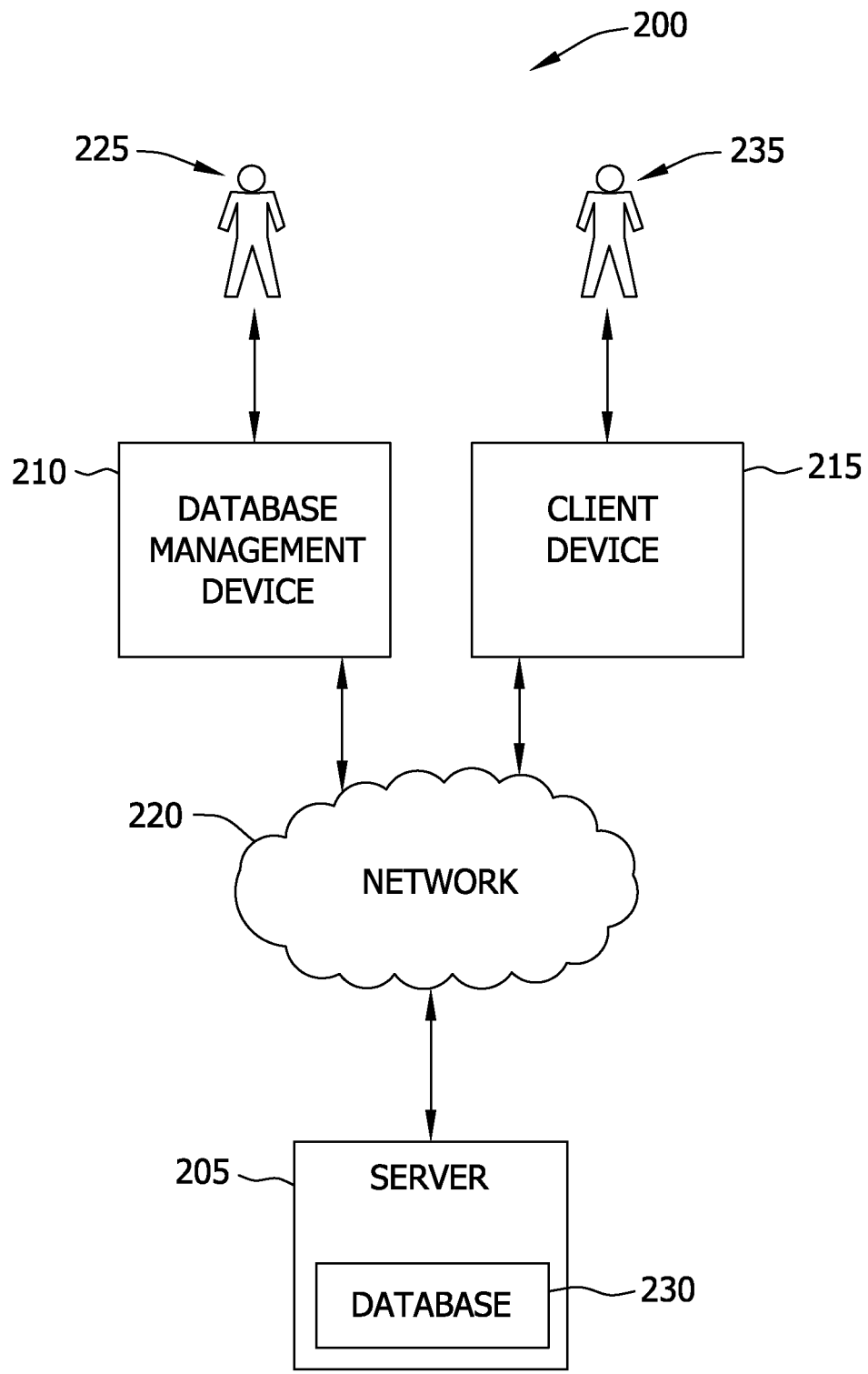
FIG. 2 is block diagram of an exemplary computing system that includes a server, a database management device, and a client device.

FIG. 2 is block diagram of an exemplary system 200 including a server 205, a database management device 210, and a client device 215 coupled in communication via a network 220. Network 220 may include, without limitation, the Internet, a local area network (LAN), a wide area network (WAN), a wireless LAN (WLAN), a mesh network, and/or a virtual private network (VPN). While certain operations are described below with respect to particular computing devices 105, it is contemplated that any computing device 105 may perform any portion or the entirety of the described operations.

In exemplary embodiments, server 205, database management device 210, and client device 215 are computing devices 105 (shown in FIG. 1). Each computing device 105 is coupled to network 220 via a communication interface 140 (shown in FIG. 1). In an alternative embodiment, server 205 is integrated with database management device 210 and/or with client device 215.

Server 205 stores data that is accessible by client device 215. In some embodiments, server 205 executes a database 230 that stores data in a structured format, such as tables with a plurality of columns and rows. In such embodiments, server 205 receives and responds to requests from database management device 210 and client device 215, as described in more detail below. In addition, or alternatively, server 205 may provide data to client device 215 from a source other than database 230. For example, server 205 may transmit files stored at server 205 or some other device to client device 215. As another example, server 205 may execute a software application, such as a web service, that provides data to client device 215.

Database management device 210 interacts with a database administrator 225 (e.g., via user input interface 135 and/or presentation interface 120). For example, database management device 210 may be configured to receive database schema data, such as definitions of tables and/or columns in a relational database, from database administrator 225. Database management device 210 transmits the schema data to server 205 via network 220. Server 205 receives and applies the schema data to database 230.

Client device 215 interacts with a user 235 (e.g., via user input interface 135 and/or presentation interface 120). For example, client device 215 may acquire and/or receive data objects provided by database 230 and present such data to, user 235. For example, client device 215 may present data using relative classification, as described in more detail below. Further, client device 215 may receive data from user 235 and submit the data to server 205, such that database 230 is updated with the submitted data.

In some embodiments, client device 215 is remote to server 205. For example, client device 215 may be located at a facility that is geographically removed from server 205 and/or database management device 210. Further, although client device 215 is described above as receiving data from server 205 and presenting the received data to user 235, in some embodiments, client device 215 presents data that is stored at client device 215. For example, client device 215 may execute database 230 and/or access data stored in one or more files at client device 215.

Figure 3:
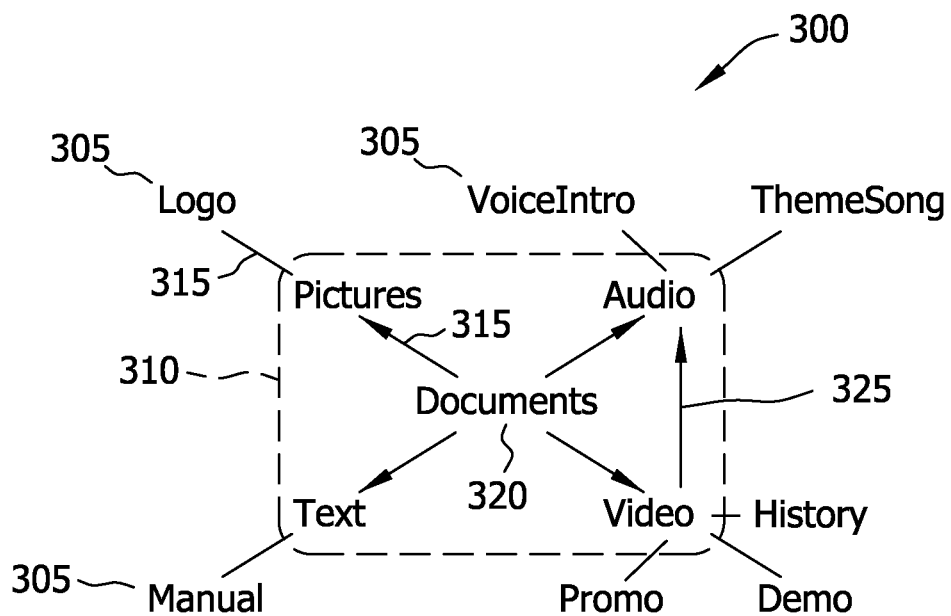
FIG. 3 is a sample graph of data nodes representing a file system.

FIG. 3 is a sample graph 300 of data nodes representing a file directory, in which data objects represent files and data sets represent folders. Graph 300 includes a plurality of file nodes 305 representing files and a plurality of folder nodes 310 representing folders, which may be viewable as sets of data objects.

Graph 300 includes edges 315 between related nodes. For example, an edge 315 from a file node 305 to a folder node 310 would indicate that the file represented by the file node 305 is contained in the folder represented by the folder node 310; an edge 315 between folder nodes 310 would indicate that one of the folders represented is a subfolder to the other.

In the example illustrated in FIG. 3, a Documents folder (represented by a Documents folder node 320) associated with a user includes four sub-folders, each of which includes one or more files (represented by file nodes 305). Further, an alias ("shortcut") for the Audio folder has been created within the Video folder, as shown by an alias edge 325. Notably, the criteria for object nodes are not violated: no file node exists without a folder node, and there is no reason to place an edge between two file nodes.

Set nodes may be unrestricted. Specifically, some sets might not contain any objects, and set nodes can have many edges among them, including "cycles", which refer to cyclical relationships that connect two or more sets to each other via multiple paths. In the example of graph 300, the Audio folder is related to the Video folder via both an intermediate folder (the Documents folder) and the alias represented by alias edge 325. In a graph without object nodes, all nodes may be classified as set nodes.

Edges 315 among set nodes can represent relationships (hierarchical or otherwise) among the sets. For example, a given folder may be contained virtually in two folders, causing a cycle in the graph. The edges can be directed or undirected, depending upon the application.

Figure 4:
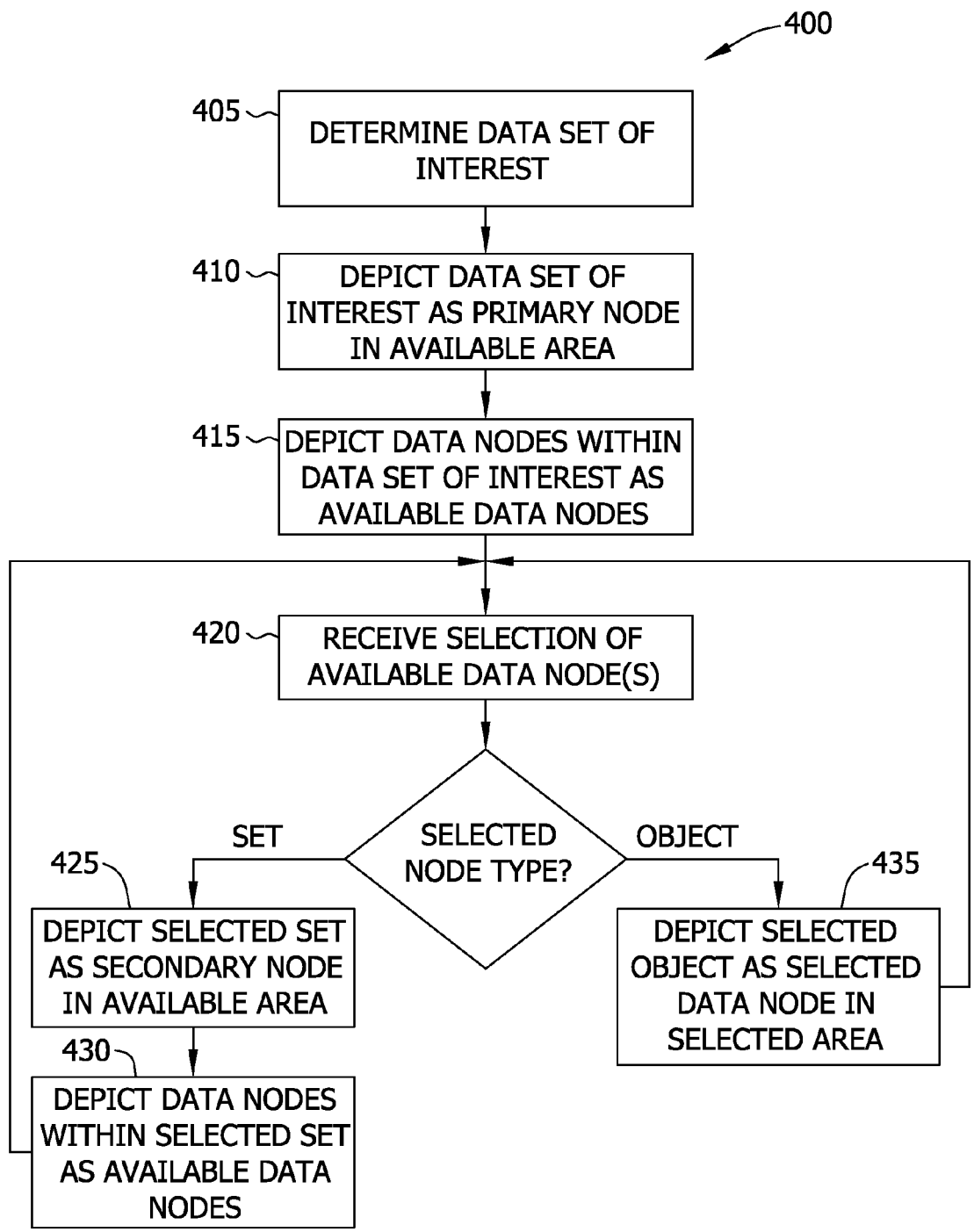
FIG. 4 is a flowchart of an exemplary method for use in enabling a user to select one or more data objects from a plurality of edge-connected data nodes that include one or more data sets and one or more data objects.

FIG. 4 is a flowchart of an exemplary method 400 for use in enabling a user to select one or more data objects from a plurality of edge-connected data nodes that include one or more data sets and one or more data objects. In exemplary embodiments, each data set includes zero or more data objects and zero or more other data sets. Portions of method 400 may be performed, for example, using any one of or any combination of computing devices 105 in system 200 (shown in FIG. 2). For illustrative purposes, method 400 is described below with reference to exemplary user interfaces shown in FIGS. 5-8, which include data from graph 300 (shown in FIG. 3).

In exemplary embodiments, computing device 105 determines 405 a data set of interest from the plurality of data nodes in the graph. The data set of interest may be related to (e.g., included in) one or more other data sets. For example, computing device 105 may receive a selection of the data set of interest via an input interface 130 (shown in FIG. 1). As another example, computing device 105 may determine a default data set of interest that is associated with the plurality of data nodes, with a user, and/or with an operation being performed by a user. In the context of graph 300 (shown in FIG. 3), if the user is opening a document or saving a new document, computing device 105 may determine 405 the data set of interest to be the user's Documents folder based on the fact that the user is performing an open or save operation with respect to documents in general. Similarly, if the user is opening or saving a particular type of file, such as a video, computing device 105 may determine 405 the data set of interest to be the Video folder. Further, after viewing a graph of nodes that are classified based on one data node of interest, as described below, the user may select another data set within the graph as the data set of interest, and the graph may be re-presented based on the newly selected data set of interest.

In exemplary embodiments, computing device 105 determines 405 the data set of interest based on a user-selected object, a skeletal graph, and/or set of standard views. A user-selected object may be defined by receiving from a user a selection of an item (e.g., a product) from an alphabetical list of names that does not show where the items appear in the graph. The initial tree (described below) would then consist of the desired node and the set node to which it is connected. A skeletal graph may include a standard (default) initial tree containing nodes that represent subsets of the graph from which the user can select a starting point. For instance, the user may be allowed to select one folder within a file system. A set of standard optional views may include one or more lists of trees, called "views" of the graph, from which a user can choose one.

Figure 5:
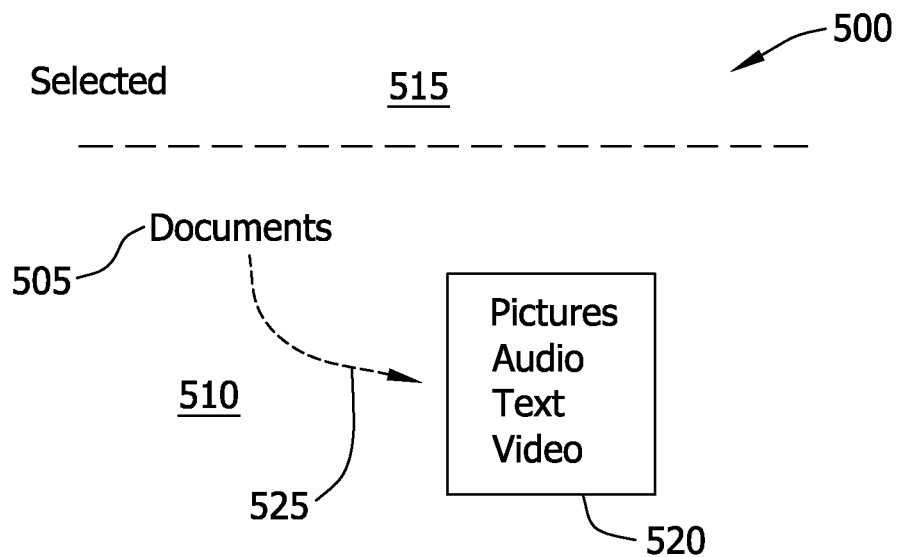
FIG. 5 is an exemplary user interface for presenting a graph of data nodes relative to a data node of interest.

FIG. 5 is an exemplary user interface 500 for presenting an initial tree of available data nodes. In exemplary embodiments, computing device 105 depicts 410 the data set of interest as a primary node 505 in an available data node area 510. User interface 500 also includes a selected data node area 515 that is initially empty.

Computing device 105 also depicts 415 one or more data nodes within the data set of interest as available data nodes 520 within available data node area 510. In some embodiments, available data node area 510 is and/or includes a menu with a collection of available data nodes, such as available data nodes 520. For example, available data nodes 520 are shown as a menu positioned adjacent to primary data node 505, but such a menu may be positioned anywhere within user interface 500. In addition, or alternatively, an edge 525 may extend between primary data node 505 and available data nodes 520. As shown in FIG. 5, the available data nodes 520 include data nodes directly related to primary node 505, all of which are data sets in the illustrated example. The available data nodes may be depicted 415 automatically and/or upon selection of primary node 505 by the user.

The user is allowed to modify the tree to show and/or to select any desired nodes, and to initiate operations associated with such nodes and/or with the tree, as described in more detail below. In exemplary embodiments, computing device 105 receives 420 a selection of one or more available data nodes 520 from the user (e.g., via an input interface 130, shown in FIG. 1). In the example illustrated, the user selects the Text folder from the available data nodes 520. In response to the selection, computing device 105 depicts the selected available data nodes based on the type (e.g., data set or data object) of each selected available data node. As described below, regardless of type, computing device 105 may draw an edge connecting the selected available data node to primary data node 505.

Figure 6:
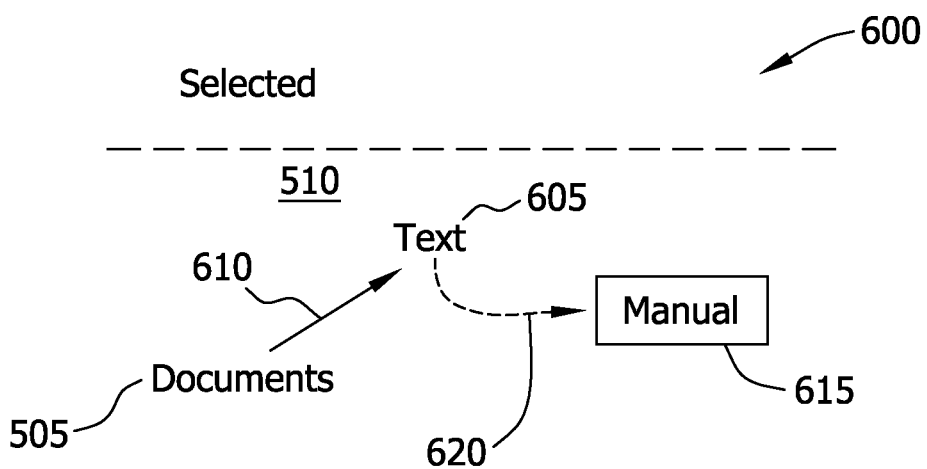
FIG. 6 is an exemplary user interface for presenting a selected available data set.

FIG. 6 is an exemplary user interface for presenting a selected available data set. When the selected available data node is a data set, such as the Text folder, computing device 105 depicts 425 the selected available data set in the available data node area 510 as a secondary data node 605 that is subordinate to the primary data node 505. In exemplary embodiments, user interface 600 includes an edge 610 extending from primary data node 505 to secondary data node 605. Edge 610 represents a hierarchical relationship between primary data node 505 and secondary data node 605.

Computing device 105 also depicts 430 data nodes within the selected available data set as available data nodes 615 within available data node area 510. For example, available data nodes 615 may be positioned adjacent to secondary data node 605. In addition, or alternatively, an edge 620 may extend between secondary data node 605 and available data nodes 615. In the example shown in FIG. 6, one data object (the Manual file) is depicted 430 as an available data node 615.

Computing device 105 receives 420 another selection of one or more available data nodes and depicts the newly selected available data nodes based on the type of each selected available data node.

Figure 7:
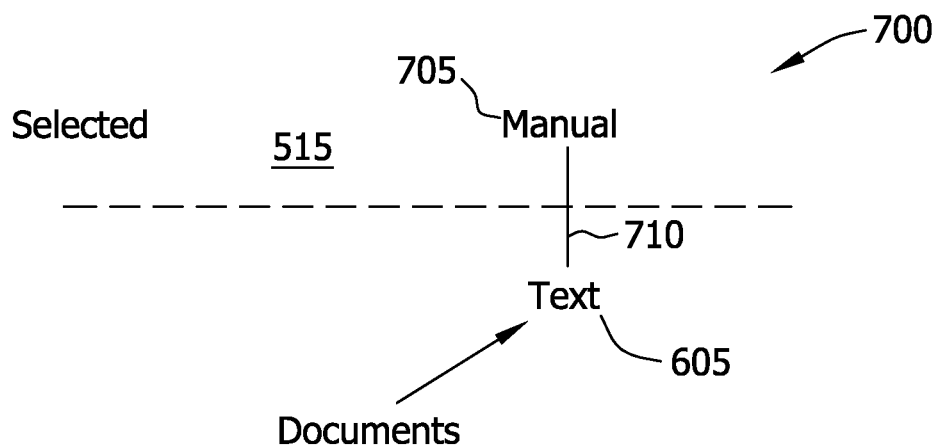
FIG. 7 is an exemplary user interface for presenting a selected data object.

FIG. 7 is an exemplary user interface 700 for presenting a selected data object. In the example illustrated in FIG. 7, the user has selected the Manual file represented by available data node 615 (shown in FIG. 6). In response, computing device 105 determines that the selected available data node is a data object and depicts 435 the selected available data node as a selected data node 705 in selected data node area 515. In exemplary embodiments, an edge 710 extends between selected data node 705 and the available data node that represents the data set containing the selected data object (e.g., secondary data node 605).

Figure 8:
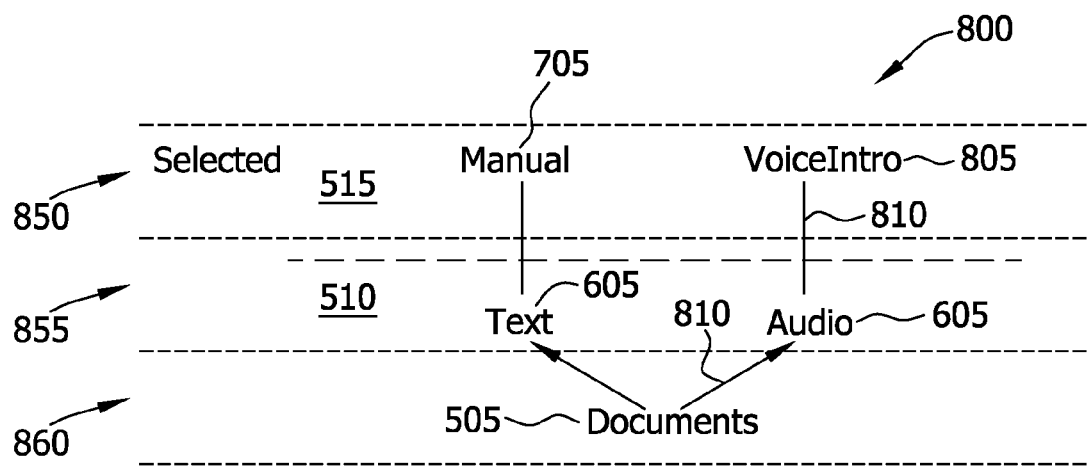
FIG. 8 is an exemplary user interface with a plurality of nodes in selected data node area.

In exemplary embodiments, the user is enabled to select data objects from various data sets within the presented hierarchy. For example, after selecting the Manual file, as described above, the user may select the Documents folder. In response to this selection, computing device 105 again depicts 430 available data nodes 520 within the Documents folder, as shown in FIG. 5. The user may select the Audio folder, in response to which computing device 105 depicts 430 the available data objects within the Audio folder (e.g., the VoiceIntro and ThemeSong files). Referring to FIG. 8, an exemplary user interface 800 with a plurality of nodes in selected data node area 515, if the user selects the VoiceIntro file, computing device 105 depicts 435 the VoiceIntro file as a selected data node 805 in selected data node area 515.

Notably, primary data node 505 and secondary data nodes 605 remain positioned in available data node area 510, with edges 810 representing relationships between data nodes. Accordingly, the path of relationships between selected data node 705 and selected data node 805 is apparent.

Notably, embodiments described enable the complexity of the overall graph to be hidden from the user. Instead of displaying all nodes within the graph, a relatively small quantity of nodes—the selected nodes and the nodes that connect the selected nodes—are presented. The user may begin traversing the graph from a portion of the graph that is known well to the user and expand or reduce the tree as desired. Accordingly, even a very large graph may not appear much more complex than the one illustrated in FIG. 4, except that set contents may be large, in which case such contents may be displayed with a scrollable subset, in a smaller scale, etc.

Depending on the application, the actual path selected might be relevant. For example, if the user chooses to save the selected files to a new drive, computing device 105 may be programmed to save the files with a folder structure identical to that represented by the selected path. In such a scenario, the behavior of computing device 105 will be different if the user instead selects the VoiceIntro file by selecting Documents, then Video, then Audio (e.g., traversing the alias between Video and Audio), even though the selected files are the same as described above.

In some embodiments, a graph of data nodes, or a portion thereof, is presented as a stratified tree. For example, referring to FIG. 8, selected data nodes 705 and 805 are positioned in a first stratum 850. Data sets adjacent to (e.g., containing) selected data nodes 705 and 805 are positioned in a second stratum 855 below first stratum 850. Data sets relating the sets in second stratum 855 (e.g., primary data node 505) are positioned in a bottom-most, or third, stratum 860. In addition, or alternatively, data nodes depicted in selected data node area 515 may be stratified, as described above. For example, if selected data node 705 is selected prior to the selection of selected data node 805, selected data node 705 may be positioned in a stratum above the stratum in which selected data node 805 is positioned. As another example, selected data nodes 705 and 805 may be stratified by user selection (e.g., dragging a node to a specific stratum).

In exemplary embodiments, computing device 105 uses a scheme of relative classification to represent the entire graph. For example, data set nodes in the current tree can be expanded (e.g., by selecting the data set nodes) into other adjacent set nodes, presented to the user as subsets relative to the current tree. The user may continue to expand subsets until a particular node (e.g., data object) is shown.

In exemplary embodiments, nodes are presented with buttons and/or menu items for performing operations associated with the tree and/or with the nodes. Upon selection of such a button, computing device 105 performs an operation associated with the button. For example, a list of operations may be presented as a menu when the user selects (e.g., clicks on) a node. Available operations may include one or more of the following:

1) Remove the node. In some embodiments, the user is not permitted to remove some data set nodes, such as the data set that contains a selected object node, or a data set that resolves an ambiguity of paths on a cycle. In some embodiments, a removal operation removes the node from the underlying graph. In other embodiments, a removal operation deselects a data node. For example, removing a selected data node shown in a selected data node area may cause that node to be removed from the selected data node area and may further cause that data node to be displayed as an available data node (e.g., if a data node containing the removed data node is selected). In addition, or alternatively, a removal operation may hide a data node by causing the data node to not be shown in an available data node area. Such hiding facilitates simplifying a user interface by omitting elements considered irrelevant by a user.

2) Expand the node to view adjacent nodes. A set node may be expandable to show all or some other adjacent nodes. In some embodiments, computing device 105 prompts the user to select which adjacent nodes to present. For example, computing device 105 may enable the user to select adjacent nodes by type, such as files or directories within a file system. Computing device 105 then presents the selected adjacent nodes.

3) Change the classification of the node within the strata of the tree. For example, an operation labeled "make selected" may cause computing device 105 to depict the node as a selected data node and/or to place a product into a shopping cart.

4) Modify an application-specific property of an object node. For example, in a network management application, the user may be presented an option to enable sharing of (e.g., remote access to) a computer on a network shared.

5) Perform an application-specific function. For example, the user may be presented an option to print or email a document.

Figure 9:
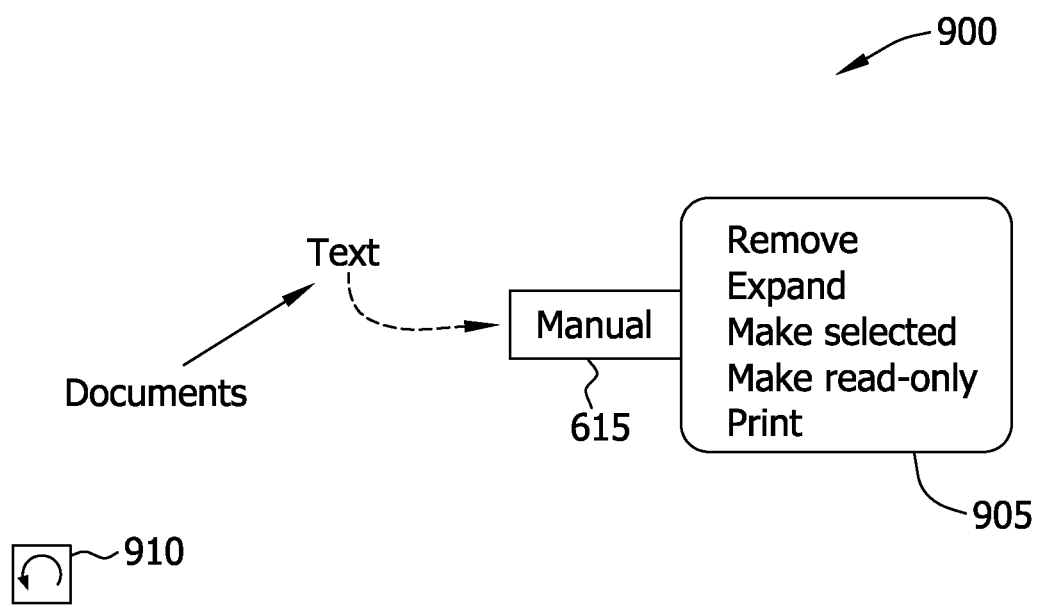
FIG. 9 is an exemplary user interface for allowing a user to perform an operation associated with a data node.

FIG. 9 is an exemplary user interface 900 for allowing a user to perform an operation associated with a data node. As shown in FIG. 9, an operation menu 905 is presented adjacent to an available data node 615. Computing device 105 may present menu 905 in response to a selection event, such as a click or a mouse-over of available data node 615. Menu 905 includes a remove operation, an expand operation, a make selected operation, a property modification operation (i.e., a make read-only operation), and an application-specific function operation (i.e., a print operation), as described above. Upon selection of an operation, computing device 105 performs the selected operation.

In some embodiments, when an expand operation is selected, computing device 105 presents the contents of the data node corresponding to the expand operation. For example, the contained data nodes may be presented in a list (e.g., as a menu), such that the contained data nodes may be viewed as available and/or selected (e.g., to become selected data nodes).

In some embodiments, computing device 105 presents a button or other option that enables the user to request that the tree be redrawn minimally. Minimal representation may depict only the selected object nodes, the set nodes adjacent to the selected nodes, and any set nodes that are required to resolve ambiguities of paths between the selected object set nodes (in the case of cycles in the underlying graph). User interface 900 includes a redraw button 910. In response to a selection of redraw button 910, computing device 105 redraws the tree minimally, as described above.

Other data, such as order, can be associated with nodes. Such additional information may be beneficial for selected items. Such data may be displayed in various ways, and even as additional nodes that connect to nodes. For example, files could be shown based on owners, last time modified, file type, and so on.

In some embodiments, computing device 105 enables a user to specify the order in which data nodes are presented. For example, whenever a user modifies the tree, a new order may be associated within each stratum of the tree. The order is by default based upon the order in which nodes are added to the given stratum, but could also be changed by the user for any node. This order may be relevant for presenting all of the nodes of a given stratum in order. For example, one possible implementation would be to show every order as a separate stratum of a single node, so that the user would be able to read the order easily going from top to bottom within the tree.

In some embodiments, graphically distinct nodes may be added to the tree as "tag nodes", indicating some sort of specific information. Most notably, a tag node could be shown as a leaf with an edge to another node (or even to an edge) with some sort of note about the other node or edge shown in the tag node. For example, in a file directory system, whenever a particular file is shown as a node, an additional linked tag node could appear connected to it noting that the file has become obsolete.

Exemplary embodiments present the graph sparsely, as opposed to presenting every node within the graph. In the event that two selected nodes have only one path between them, two selected nodes may be represented within the tree as adjacent. By contrast, when the user adds a node to the tree using a path that traverses a cycle, then the path is ambiguous. This can be handled in various ways. First, the path could be left unspecified by the tree, but when the user hovers a pointer over an edge associated with the node (or otherwise requests more information), the path could be provided to and/or modified by the user. As a second option, the complete path within the cycle could be shown explicitly. As a third option, a portion of the path within the cycle could be shown explicitly, and further details could be provided to the user upon request.

Graphical distinction, as described herein, may be accomplished using a background pattern, a background color, a line weight, a line pattern, a line color, an icon, an animation, and/or any other method of visually differentiating user interface elements from one another. For example, edges may be generally drawn with a solid line pattern, whereas edges associated with a longer path may be drawn with a dashed line pattern.

In exemplary embodiments, both a general graph and a SDST (stratified tree adapted to being dynamically modified to add or remove nodes of the graph) are used. User transactions affect the changes which are maintained by incremental programmatic modifications to the tree. A simple sample drawing algorithm is brought for the dynamic rendering of the tree.

Some embodiments are operable with a class of graphs that may be referred to as Object-Set Graphs, defined as follows: 1) Every node is either an object or a set node; 2) An object node contains exactly one edge, which is to a set node; and 3) Set nodes can contain multiple edges, which can include both object nodes and other set nodes.

Any graph can be reduced to an object-set graph by treating all of the nodes as set nodes. Embodiments described may be particularly relevant to connected portions of graphs. The pseudocode provided below assumes that the entire graph is connected. Listing 1 below specifies pseudocode for a simple object-set graph.

---
Listing 1
---

```
class Graph
        GraphNode[ ] nodes;
    end
    enum NodeType {SET, OBJECT};
    enum EdgeType {CLASSIFICATION, SUBSET};
    enum EdgeDirection {FORWARD, BACKWARD, BOTH,
    UNDIRECTED};
    class GraphNode
```

Listing 1

```
        NodeType type;
        Object entity;
        GraphEdge[ ] edges;
    end
    class GraphEdge
        GraphNode n1;
        GraphNode n2;
        EdgeType type;
        EdgeDirection direction;
        Object properties;
        GraphNode otherNode(GraphNode inNode) {
                if (inNode==n1) {return n2;}
                else if (inNode==n2) {return n1;}
                else {return null;}
        }
    end
```

In exemplary embodiments, an "abstract class", meaning a class that requires subclasses to specify one or more basic methods, may be shared between set nodes and object nodes. Trivial details of implementation may not be specified herein.

An SDSTEdge can be an entire path of edges in the graph.

The user may want to see or open the first classification node on either side. This node may state the relationship of the second endnode relative to the first. Towards this end, a method ViewFirstClassFor(node) is built into the class SDSTEdge. Listing 2 below specifies pseudo code for an SDSTEdge object.

Listing 2

```
class SDSTEdge
    SDSTNode firstNode;
    SDSTNode lastNode;
    GNodeMapping path[ ];
    SDSTEdge(SDSTNode firstNode,
                SDSTNode lastNode,
                GEdgeMapping path[ ])
        {this.firstNode = firstNode;
         this.lastNode = lastNode;
         this.path = path;}
    GraphNode ViewFirstClassFor(SDSTNode tNode) {
        if (node=firstNode) {return GraphEdge[0].other(node);}
        else if (node=lastNode) {
            return GraphEdge[GraphEdge.size].other(node);
        }
        else {return Error;}
    }
    SDSTNode other(SDSTNode n){
        if (n=firstNode) {return lastNode;}
        else if (n=lastNode) {return firstNode;}
        else {Error;}
    }
    SDSTNode getTNode(GraphNode gNode} {
        if (firstNode.gNodeMapping.node=gNode)
                {return firstNode;}
        else if (lastNode.gNodeMapping.node=gNode)
                {return lastNode;}
        else
                {return null;}
    }
    void remove( ) {
        if ((isHidden(firstNode)) orlog
                (isHidden(lastNode))) {
                    forallninlogpath {
                        n.list.remove(this);
                    }
                    path := null;
        } else {
                Error;
        }
    }
end
```

Listing 3 below specifies pseudocode for an SDSTNode object.

Listing 3

```
abstract class SDSTNode extends StratifiedTreeNode
    GNodeMapping gNodeMapping;
    SDSTEdge edges[ ];
    boolean visited;              //used for drawing
    boolean bottomLine;           //used for drawing
    int higherEdgeCount;          //used for drawing
    int higherDrawnCount;         //used for drawing
    int sameEdgeCount;            //used for drawing
    int sameDrawnCount;           //used for drawing
    int left, right, top, bottom,
            height, width, midpoint,
            leftRange, rightRange;  //used for drawing
    Button button;                //used for drawing
    abstract SDSTNode(GraphNode gNode); // constructor
    abstract NodeType getType( );
    abstract boolean isHidden( );
    abstract remove( );
    abstract view( );
    SDSTEdge getTEdge(GraphNode gNode} {
        SDSTNode tNode=null;
        foralleinlogedges {
                tNode=e.other(this);
                if (tNode.gnodeMapping.node==gNode)
                        {return e;}
        }
        return e;
    }
end class
class ObjectNode extends SDSTNode
    ObjectState state;
    SDSTEdge classification;
    ObjectNode(GraphNode gNode, ObjectState status) {
        if gNode.getType <> OBJECT)
                {Error;}
        else
                {this := addNode(gNode);
                 state=status;}
    }
    getType( ){return OBJECT;}
    getSet( ){return classification.other(this);}
    isHidden( ) {return (status=HIDDEN);}
    remove( ) {
        status := hidden;
        getSet( ).edges(remove classification);
    if (getSet( ).edges.size=1)
        {getSet( ).setState(VIEWEDLEAF);}
    else
        {getSet( ).setState(VIEWEDINTERNAL);}}
        }
        classification.remove( );}
end class
class SetNode extends SDSTNode
    SetState state;
    SDSTEdge edges( );
    NodeType getType( ) {return SET;}
    isHidden( ) {return (status=HIDDEN);}
    remove( ) {
        if (status=OPENED|PATHINDICATOR|MULTIPLE)
                {Error;}
        case edges.size
                >2: Error;
                2: {node1 := edges[0].other;
                    node2 := edges[1].other;
                    newPath[ ] := edges[0].path + edges[1].path;
                    if (this.getparent( )=node1) {node2.parent :=
                        node1;}
                    else {node1.parent := node 2;}
                    newEdge := SDSTEdge{node1,node2,
                    newPath;}
                    node1.edges.add(newEdge);
                    node2.edges.add(newEdge);
                    edges[0].remove;
                    edges[1].remove;}
                1: {otherNode := edges[0].other(this);
                    otherNode.edges(remove classification);
                    this.edges(remove classification);
        {case otherNode.state
            OPENED:
                {if (state= VIEWEDLEAF)
```

Listing 3

```
            if (otherNode.edges.size=1)
                {otherNode.setState(VIEWEDLEAF);}
            else
                {otherNode.setState(VIEWEDINTERNAL);}}}
    VIEWEDLEAF:
        {if otherNode.edges.size<3
            {otherNode.setState(VIEWEDLEAF);}}}
    CONNECTING:
        {if otherNode.edges.size<4
            {otherNode.setState(HIDDEN);}}}
    end case}}
                                classification.remove( );}
                        }
                    0: Error; //this shouldn't happen
            end case
            setState(HIDDEN);
        }
        view( ) {
            if (gNodeMapping.list.size( )>1) {
                setState(VIEWEDINTERNAL);}
            else {
                setState(VIEWEDLEAF);
            }
        }
    private setState(SetState newState) {
        if (state <> newState) {
        SetState oldState := state;
        state := newState;
        case state
            VIEWEDLEAF: stratum := VIEWED_STRATUM;
            OPENED: stratum := OPENED_STRATUM;
            VIEWEDINTERNAL, CONNECTING:
                stratum := calculateInterpathStratum( );
        end case
            forall e in edges
                {if
(e.state=VIEWEDINTERNALLY|CONNECTING|MULTIPLE|
PATHINDICATOR)
                {calculateInterpathStratum( )}}
        }
    }
        private calculateInterpathStratum(SDSTNode n) {
                int lowestAdjacentStratum := 0;
                int numberLowestNeighbors := 0;
                foralleinlogn.edges {
                        if (e.stratum.number > lowestAdjacentStratum)
                            {lowestAdjacentStratum = e.stratum.number;
                                numberLowestNeighbors := 1;}
                        else if (e.stratum = lowestAdjacentStratum)
                            {numberLowestNeighbors++;}
                }
                if (lowestAdjacentStratum < TOP_PATH_STRATUM)
                    {n.stratum := strata[TOP_PATH_STRATUM];}
                else if (lowestAdjacentStratum > n.stratum.number)
                    {if (numberLowestNeighbors > 1)
                        {stratum := lowestAdjacentStratum+1;}}
                else if (numberLowestNeighbors > 1)
                    {stratum := lowestAdjacentStratum+1;}
                else
                    {stratum := lowestAdjacentStratum;}
        }
end class
```

Listing 4 below specifies pseudocode for supplementary SDST objects.

Listing 4

```
    enum ObjectState {HIDDEN, SELECTED};
    enum SetState {HIDDEN, VIEWEDLEAF, OPENED,
VIEWEDINTERNAL,
    CONNECTING, MULTIPLE, PATHINDICATOR};
    const SELECTED_STRATUM = 0;
    const VIEWED_STRATUM = 1;
    const OPENED_STRATUM = 2;
```

Listing 4 (continued)

```
    const TOP_PATH_STRATUM =3;
    class Stratum
            int number;
            string name;
            int top;
            int bottom;
    end class
    class GEdgeMapping
            GraphEdge edge;
            SDSTEdge list[ ];
            boolean isListEmpty( )
                    {if (list.size<1) {true} else {false;}}
    end class
    class GNodeMapping
            GraphNode node;
            SDSTNode list[ ];
            SDSTEdge edge; //if node is contained in one tree Edge
            and not Nodes.
            boolean isListEmpty( )
                    {if (list.size<1) {true} else {false;}}
    end class
```

Listing 5 below specifies pseudocode for an SDST object.

Listing 5

```
class SDST extends StratifiedTree
    /*
    * This class contains the components of a stratified tree
    * with a list of SDSTEdges and using SDSTNodes for the nodes
    * of the tree. Alternatively, rather than an extension
    * of the stratified tree class, it could be a replacement so that
    * the SDSTNode can be used in place of the StratifiedTreeNodes.
    */
    Graph graph;
    SDSTEdge edges[ ];
    void addNodeFromGraph(SDSTNode originTNode, GraphEdge
path[ ]){
        boolean onTreePath = true;
        GraphNode lastGNode;
        SDSTNode tNode;
        SDSTEdge tEdge;
        GraphNode gNode;
        GraphEdge gEdge;
        int originIndex;
        tNode := originTNode;
        gNode := originTNode.gNodeMapping.node;
        for (i:=0,i<path.size( );i++) {
            gEdge := path[i];
            lastGNode := gNode;
            gNode := gEdge.otherNode(gNode);
            tEdge := tNode.getTEdge(gEdge);
            if (onTreePath) {       // prior node was on the tree
                if (tEdge==null) { // new edge leaves the tree
                    // set origin node
                    if (gNodeMapping[lastGNode].isListEmpty( )) { //last
gNode was hidden in a tEdge
                        tNode := new SDSTNode(lastGNode, CONNECTING);
                        tEdge := new SDSTEdge(origin, Tnode,
                        path[originIndex..i]);
                        originNode := tNode;
                    }
                    else {
                        originNode := tEdge.getTNode(lastGNode);
                    }
                    originIndex := i−1;
                    //create new path if necessary
                    if (gNodeMapping[gNode.number].isListEmpty( )) {//new
node is not on the tree
                        onTreePath := false;
                    }
                    else { //node is on tree even though edge is not
                        tNode := new SDSTNode(gNode, MULTIPLE);
                        tEdge := new SDSTEdge(origin, Tnode, path[i−1..i]);
                        originNode := tNode;
```

Listing 5

```
            originIndex := i;
         }
      }
   }
   else { // onTreePath=False -- prior node was off of the tree
      if (gNodeMapping[gNode.number].edge != null) { //new node
is on the tree hidden in an edge
         tNodeOtherDouble := new SDSTNode(gNode, MULTIPLE);
gNodeMapping[gNode.number].edge.splitWithNode(tNodeOtherDouble);
      }
      if (!gNodeMapping[gNode.number].isEmptyList( )) {//new node
is on the tree in a node
         onTreePath=true;
         tNodePI := new SDSTNode(gNode, PATHINDICATOR);
         tEdge := new SDSTEdge(origin, tNodePI,
         path[originIndex..i-1]);
         tNode := new SDSTNode(gNode, MULTIPLE);
         tEdge := new SDSTEdge(tNodePI, Tnode, path[i-1..i]);
         originIndex := i;
      }
   }
}
void removeNodeFromTree(SDSTNode tNode) {
   tNode.remove( );
}
end class
```

Listing 6 below specifies pseudocode for a user interface object. The drawTree( ) method below may be any Stratified Tree algorithm. The fundamental preferred approach is a depth-first traversal.

Listing 6

```
class SDSTPane extends StratifiedTreePane
   Graph graph;
   SDSTEdge[ ] edges;
//   SDSTNode[ ] nodes
//   Stratum[ ] strata
   Button edgeButtons[SDSTEdge.size] //two per edge, one closer to
each node
      {Event edgeButtons(i).left-click: edges[i].properties
      Event edgeButtons(i).right-click:
      edges[i].viewFirstClassFor(endNode)};
   Button nodes[SDSTNode.size]
      {Event nodes(i).left-click: edges[i].properties
      Event nodes(i).right-click:
         Menu--
         (1) hide
         (2) contents //(for sets) view cascading lists of contents--
            // left-clicking any option shows the node;
            // right-clicking any option reveals its own contents.
      };
   void hide(SDSTNode tNode);
   void show(GraphNode gNode);
   void clearPicture( ); //trivial. Remove all buttons and lines
   void removeNode(SDSTNode node);
   void removeEdge(SDSTEdge edge);
   void addNode(GraphNode node);
   void drawTree( ) {
      clearPicture( ) ;
      drawButtons( ) ;
      drawEdges( ) ;
   }
   void drawButtons( ) {
      Stack s;
      forall n in nodes {n.visited := false}
      clearPicture( );
      s.push root; //should be a selected object if any exist
                   // otherwise, a viewed set
      do while (!s.empty( )) {
         n := s.pop;
         if (n.visited) {
```

Listing 6

```
            forall e in n.edges s.t.
               (e.other(n).stratum <= n.stratum) {
               //create button
               nButton:=Button(n.name);
               n1:=e.other(n);
               if n1.left < n.leftRange {n.leftRange=n1.left};
               if n1.right > n.rightRange {n.rightRange=n1.right};
               n.left := n.leftRange
                  + ((n.rightRange - n.leftRange)/2)
                  - (nButton.length/2);
               n.right := n.left + nButton.length;
               place(nButton, n.left, n.right);
            }
         }
         else {
            sort(n.edges, stratum); //n.edges by stratum
            forall c in n.children s.t.
               (c.stratum > n.stratum) {s.push(c);}
            n.visited := true;
            s.push(n);
            forall c in n.children s.t.
               (c.stratum <= n.stratum) {s.push(c);}
         }
      }
   }
   void drawEdges( ) {
      for (i=0; i<nodes.size; i==) {
         bottomLine[i]:=false;
         lowerEdgeCount[i]:=0;
         higherEdgeCount[i]:=0;
      }
      forall e in edges {
         if (e.n1.stratum > e.n2.stratum) {
            lowerEdgeCount[n1.number]++;
            higherEdgeCount[n2.number]++;}
         elseif (e.n2.stratum > e.n1.stratum) {
            lowerEdgeCount[n2.number]++;
            higherEdgeCount[n1.number]++;}
         else {
            if (n1.left < n2.left) {
               sameEdgeCount[n1.number]++;}
            else {
               sameEdgeCount[n2.number]++;}
         }
      }
      forall e in edges {drawEdge(e);}
   }
   void drawEdge(e) {
      if (e.n1.stratum > e.n2.stratum) {
         nHigher := e.n1
         nLower := e.n2}
      else {
         nHigher := e.n2
         nLower := e.n1}
      if bottomLine[nHigher.number] = false {
         drawLine(
            nHigher.midpoint,
            nHigher.top+nHigher.height,
            n.midpoint,
            strata[nHigher.stratum].bottom)
         bottomLine[nHigher.number] := true}
      if nHigher.stratum != nLower.stratum {
         drawLine(nHigher.midpoint,
            nHigher.stratum.bottom,
            nLower.left +
               ((nLower.width/
                  (nLower.higherEdgeCount+1))
               *(nLower.higherDrawnCount+1)),
            nLower.top)}
      else {
         drawline(nHightler.midpoint,
            nHigher.stratum.bottom,
            nHigher.top + nHigher.height +
               ((nHigher.stratum.bottom -
                  (nHigher.top +
                  nHigher.height))/(nHigher.sameEdgeCount+1))
               *(nHigher.sameDrawnCount+1)),
```

-continued

```
Listing 6 nLower.left +
            (nLower.width/(nLower.higherEdgeCount+1)),
            nLower.top+nLower.height)}
    }
end
```

Exemplary Operating Environment

Operations described herein may be performed by a computer or computing device. A computer or computing device includes one or more processors or processing units and at least one memory device, such as a system memory and/or some form of computer-readable media. By way of example and not limitation, computer-readable media comprise computer storage media and communication media. Computer storage media are non-transitory and include volatile and nonvolatile, removable and non-removable media implemented in any method or technology for storage of information such as computer-readable instructions, data structures, program modules or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

In exemplary embodiments, any portion or the entirety of the operations described herein are encoded as computer-executable instructions, which are embodied on one or more non-transitory computer-readable media. When executed by at least one processor, the computer-executable instructions cause the processor to perform the encoded operations.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other apparatus and methods.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for enabling a computer user to view just a selected portion of a complex graph, said graph comprising a plurality of data set nodes, wherein each data set node includes zero or more data object nodes and zero or more other data set nodes, and every node in the complex graph that is not displayed in the selected portion is contained in at least one displayed data set node, the method comprising:

determining a data set node of interest from among the plurality of data set nodes;

visually depicting, in an available data nodes area of a user display, the data set node of interest as a primary node;

visually depicting, within the available data nodes area, at least one additional data node that in the graph is included in the data set node represented by the primary node;

receiving a first selection of a data node that is depicted within the available data nodes area;

when the first selected node is a data object node, moving the first selected node from the available data nodes area to a separate selected nodes area within the user display; and when the first selected node is a data set node:

visually depicting, within the available data nodes area, the first selected node as a secondary data node subordinate to the primary node;

visually depicting, in the available data nodes area, data nodes that, in the graph, lie within the first selected data set node as a second set of available data nodes;

enabling the user to select an operation from a plurality of operations associated with one of the available data nodes from the second set, wherein the operations comprise a remove operation causing removal of the available data node from the second set, and an expand operation triggering visual depiction of nodes adjacent to the available data node from the second set; and performing the selected operation.

2. A method in accordance with claim 1, further comprising the step of visually depicting an edge connecting the first selected node to the primary node.

3. A method in accordance with claim 1, further comprising:

receiving a selection of one of the data nodes from the second set;

when the selected node from the second set is a data object node, visually depicting, in the selected data nodes area, the selected node from the second set as a second selected data node; and visually depicting an edge between the data node from the second set and the second selected data node.

4. A method in accordance with claim 1, wherein when the first selected node is a data object node the method further comprises:

receiving a selection of a second data object node; and visually depicting, in the selected data nodes area, the second data object node as a second selected data node.

5. A method in accordance with claim 4, wherein, in the graph, the second data object node is contained in a subset of the primary data node, and the method further comprises:

visually depicting an edge connecting the first selected data node to the primary data node;

visually depicting an edge connecting the second selected data node to a secondary data node representing the subset; and visually depicting an edge connecting the secondary data node to the primary data node.

6. A device comprising:
a memory for storing a graph comprising a plurality of data nodes comprising one or more data set nodes and one or more data object nodes, wherein each data set node includes zero or more data object nodes and zero or more other data set nodes; and
a hardware processor coupled to the memory and programmed to:
visually depict, in an available data nodes area of a user display, a data set node of interest as a primary node;
visually depict as available data nodes within the available data nodes area, one or more data nodes that in the graph are contained within the data set node of interest;
receive a first selection of an available data node;
when the first selected available data node is a data object node, visually depict, in a selected data nodes area separate from the available data nodes area, the first selected node; and
when the first selected node is a data set node:
visually depict, in the available data nodes area, the first selected node as a secondary data node subordinate to the primary node;
visually depict, in the available data nodes area, data nodes that in the graph lie within the selected node as a second set of available data nodes;
allow the user to select an operation from a plurality of operations associated with a data node from the second set of available data nodes, wherein the operations include at least one of a remove operation that removes the node from the second set of available data nodes and an expand operation that visually depicts nodes adjacent to the node from the second set of available data nodes; and
perform the selected operation.

7. A device in accordance with claim 6, wherein the processor is further programmed to visually depict an edge connecting the first selected node to the primary node.

8. A device in accordance with claim 6, wherein the processor is further programmed to:
receive a selection of one of the available data nodes from the second set;
when the selected node from the second set is a data object node, visually depict the selected node from the second set as a second selected data node in the selected data nodes area; and
visually depict an edge between the data node from the second set and the second selected node.

9. A device in accordance with claim 6, wherein when the first selected available data node is a data object node, the processor is further programmed to:
receive a selection of a second data object from the available data nodes area; and
depict the second data object as a second selected data node in the selected data nodes area.

10. One or more non-transitory computer-readable media having computer-executable instructions embodied thereon, wherein when executed by at least one processor, the computer-executable instructions cause the processor to:
depict a data set of interest as a primary node in an available data nodes area of a user display;
depict one or more data nodes within the data set of interest as available data nodes within the available data nodes area;
receive a first selection of an available data node;
when the first selected available data node is a data object, depict the first selected available data node as a first selected data node in a selected data nodes area of the user display, said selected data nodes area being separate from the available data nodes area; and
when the first selected available data node is a data set:
depict the first selected available data node in the available data nodes area as a secondary data node subordinate to the primary data node;
depict data nodes within the selected data set as second available data nodes in the available data nodes area;
allow the user to select an operation from a plurality of operations associated with one of the second available data nodes, wherein the operations include a remove operation that removes the second available data node from the user display and an expand operation that depicts on the user display nodes adjacent to the second available data node; and
perform the selected operation.

11. One or more non-transitory computer-readable media in accordance with claim 10, wherein the computer-executable instructions further cause the processor to draw an edge connecting the first selected available data node to the primary data node.

12. One or more non-transitory computer-readable media in accordance with claim 10, wherein the computer-executable instructions further cause the processor to:
receive a selection of one of the second available data nodes; and
when the selected second available data node is a data object, depict the selected second data node as a selected second data node in the selected data nodes area and depict an edge between the second data node and the selected second data node.

13. One or more non-transitory computer-readable media in accordance with claim 10, wherein when the first selected available data node is a data object, the computer-executable instructions further cause the processor to:
receive a selection of a second data object; and
depict the second data object as a second selected data node in the selected data nodes area.

14. One or more non-transitory computer-readable media in accordance with claim 13, wherein, in the graph, the second data object is contained in a subset of the primary node, and the computer-executable instructions further cause the processor to:
draw an edge connecting the first selected data node to the primary node;
draw an edge connecting the second selected data node to a secondary data node representing the subset; and
draw an edge connecting the secondary data node to the primary data node.

* * * * *